Figure 1:
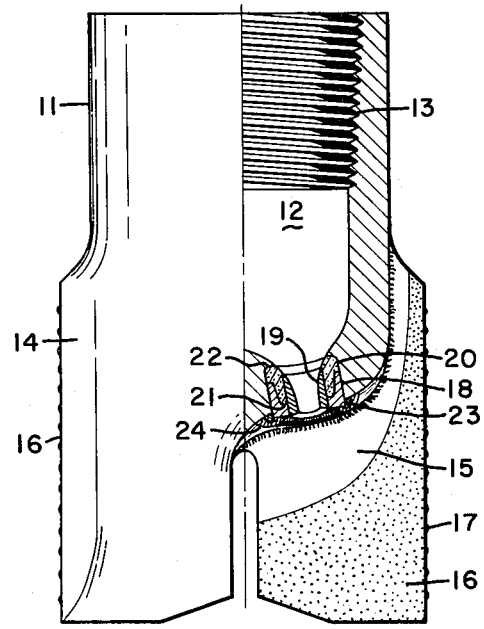

EROSION RESISTANT NOZZLE ASSEMBLY AND METHOD FOR FORMING

Filed Feb. 1, 1962

David S. Rowley
Harold C. Bridwell INVENTORS

BY *James E. Reed*

ATTORNEY

United States Patent Office 3,131,779
Patented May 5, 1964

3,131,779
EROSION RESISTANT NOZZLE ASSEMBLY
AND METHOD FOR FORMING
David S. Rowley and Harold C. Bridwell, Tulsa, Okla.,
assignors to Jersey Production Research Company, a
corporation of Delaware
Filed Feb. 1, 1962, Ser. No. 172,049
11 Claims. (Cl. 175—393)

The present invention relates to tools containing nozzles through which fluids may be discharged at high velocities and more particularly relates to drill bits and similar tools provided with improved nozzles which are more easily installed and less subject to erosion than nozzles employed in the past. In still greater particularity, the invention relates to an improved nozzle assembly wherein a hard metal carbide nozzle is bonded to a ferroalloy surface with a metal matrix containing finely divided hard metal carbide.

The bits employed in drilling oil wells, gas wells and similar boreholes in the earth normally contain two or more nozzles through which drilling fluid can be discharged at high velocities in order to entrain cuttings and carry them to the earth's surface. To reduce erosion, it has become common practice to utilize nozzles of tungsten carbide or a similar hard, erosion-resistant material in such bits. The nozzles are generally fabricated by casting or sintering tungsten carbide or similar material to the desired nozzle shape and then brazing the cast or sintered product to a steel sleeve which can be welded to the underside of the bit body. The nozzle assembly is frequently welded in place by the bit manufacturer. In many instances, however, it is shipped separately and is installed in the field after the nozzle size required for optimum bit performance in a particular drilling operation has been determined.

Although nozzle assemblies of the type described above are widely used on drill bits and other tools which require highly erosion-resistant nozzles, they have not been found wholly satisfactory. Experience has shown that brazing the carbide nozzle to a steel sleeve imposes severe limitations upon the temperatures which can be used in later welding the nozzle assembly in place. If the welding temperature is too high, the silver solder or similar material used in the brazing operation will melt and hence and bond between the carbide and steel will be weakened or destroyed. If the welding temperature is too low, an adequate bond between the steel sleeve and tool surface cannot be obtained. Moreover, the weld and brazing material are both relatively soft and are highly subject to erosion even though a good bond is secured. Studies have shown that 25% or more of the oil field drill bits used in certain areas have to be pulled from the borehole prematurely because of nozzle failure. Efforts to improve nozzle performance by utilizing methods other than welding to attach the nozzles have been only partially successful.

The present invention provides a new and improved nozzle assembly for drill bits and other tools which largely obviates the difficulties outlined above. In accordance with the invention, it has now been found that hard metal carbide nozzles bonded to steel or a similar ferroalloy by means of a metal matrix containing finely divided hard metal carbide have considerably greater erosion resistance and can be more easily installed on bits or similar tools than nozzles utilized heretofore. The use of a matrix metal melting above about 1550° F. permits the attachment of such a nozzle by means of a steel welding sleeve without danger of weakening the bond between the metal carbide and the sleeve when the assembly is subsequently welded in place. The matrix containing finely divided metal carbide is much less susceptible to erosion than silver solder and similar brazing metals. The welded joint between the welding sleeve and tool can be hard surfaced to protect it against erosion following installation of the assembly without damaging the matrix. Since both the matrix and weld can thus be made highly resistant to erosion, the likelihood of nozzle washout when fluids containing sand particles and other abrasive solids are circulated at high velocities is greatly reduced.

The hard metal carbide nozzle utilized in the nozzle assembly of the invention may be made of a variety of metal carbides having Rockwell hardness values in excess of about 85 on the A scale. Such carbides include tungsten carbide, titanium carbide, tantalum carbide, niobium carbide, chromium carbide, silicon carbide, molybdenum carbide, vanadium carbide, zirconium carbide and mixtures of these. Tungsten carbide, tungsten-titanium carbide, tungsten-tantalum-niobium carbide, and tungsten-titanium-tantalum-niobium carbide are generally preferred for purposes of the invention because of their hardness, their shock resistance and their ready availability from commerical sources. Such carbides may be of either the cast or cemented type. The cast carbides are normally produced by reducing a compound of tungsten or similar metal with carbon in a high temperature furnace. The cemented carbides are obtained by powdering cast carbide and sintering it with from about 3 percent to about 25 percent of an iron, nickel or cobalt binder. Cobalt is most frequently used. The cemented carbides are usually not quite as hard but have better shock resistance than the corresponding cast carbides and are therefore particularly preferred for purposes of the invention. Tubular nozzles may be formed from these and other hard metal carbides by conventional casting, sintering, or extrusion techniques.

The matrix metal used in bonding the carbide nozzle to a steel or similar ferroalloy surface in accordance with the invention may be selected from any of a number of metals which melt at temperatures between about 1550° F. and about 2400° F. and have the ability to wet both the ferroalloy and the hard metal carbide utilized. Metals melting at temperatures substantially in excess of about 2400° F. are generally unsatisfactory because such temperatures may be injurious to the hard metal carbide; while metals melting at temperatures below about 1550° F. are unsuitable because they may be adversely affected during subsequent welding of the nozzle assembly. Suitable alloys include copper-nickel alloys; copper-nickel-tin alloys; copper-nickel-iron alloys; copper-cobalt-tin alloys; copper-nickel-manganese alloys; iron-nickel-carbon alloys; copper-nickel-iron-tin alloys and the like. Such alloys may contain minor quantities of other metals including zinc, tin, boron, beryllium, cadmium, silicon, manganese and cobalt. S-Monel and a number of other commercially available metals and metal alloys which melt within the specified temperature range and have the ability in the molten state to wet steel and the hard metal carbides may be employed. In general, the copper-nickel alloys are preferred for purposes of the invention. Alloys containing from about 25 to about 75 percent nickel are particularly effective.

The hard metal carbide which is used in finely divided form in the bond between the carbide nozzle and the steel or other ferroalloy may be selected from a variety of metal carbides having Rockwell A hardness values in excess of about 85. Tungsten carbide, tungsten-titanium carbide, tungsten-tantalum-niobium carbide and tungsten-titanium-tantalum-niobium carbide are most readily available from commercial sources and will generally be preferred. The carbide thus employed is utilized in the form of a powder ranging between about 100 and about 400 mesh on the Tyler screen scale. The powdered carbide is normally prepared by ball milling particles of the selected carbide and screening the product. From about 10 percent to about 25 percent of iron, nickel or cobalt may be ball-milled with the carbide in order to increase its wettability of the matrix metal. Either cast or cemented carbide may be used to produce the powder.

The improved nozzle assembly of the invention may be fabricated by first placing a tubular carbide nozzle and a steel sleeve in a suitable refractory mold and filling the annular space between the sleeve and nozzle with the powdered carbide to be used. After the mold has been heated to an infiltration temperature between about 1750° F. and about 2500° F., the powdered metal carbide is infiltrated with the molten matrix metal to effect a bond between the sleeve and nozzle. At the end of from about 3 to about 20 minutes, the mold is allowed to cool and the nozzle assembly may then be removed. The assembly can be heat treated to relieve thermal stresses and may be ground to remove excess matrix metal and surface irregularities. Thereafter, it may be welded to the drill bit or similar tool to provide a nozzle which is considerably more resistant to erosion than nozzles available in the past. The exposed surface of the nozzle and the weld can then be coated with a hard surfacing material to control erosion.

Figure 2:
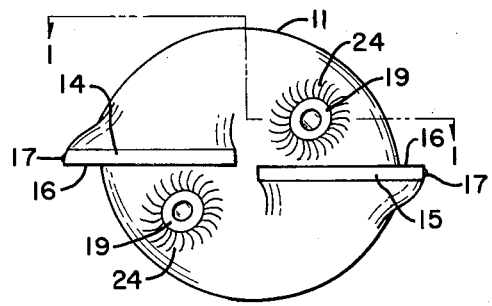

The nature and objects of the invention can be more fully understood by referring to the following detailed description of a rotary drill bit provided with the improved nozzle assembly and the method employed to fabricate the assembly, and to the accompanying drawing, in which:

FIGURE 1 is a vertical elevation, partially in section, of a rotary drag bit provided with the improved nozzle assembly of the invention; and, FIGURE 2 is a bottom view of the bit depicted in FIGURE 1

Turning first to FIGURE 1 of the drawing, reference numeral 11 therein designates a generally cylindrical drag bit body containing an internal passageway 12 into which drilling fluid may be introduced from a drill string not shown in the drawing. Internal threads 13 in the upper part of passageway 12 are provided to form a standard API tool joint box by means of which the bit may be connected to the drill string. External threads may be provided to form a pin, rather than a box, connection if desired. Blades 14 and 15 are welded to the bottom and sides of body 11 and extend downwardly to contact the formation beneath the body. As can be seen more clearly from FIGURE 2 of the drawing, the back of each blade is built up by welding in order to increase blade strength and effect a better bond between the blade and the bit body. The bottom of each blade is initially tapered from an intermediate point upwardly to the inner edge of the blade as shown in FIGURE 1 in order to center the bit in the borehole during the first stages of the drilling operation. The taper angle will normally fall between about 15 degrees and about 45 degrees from the horizontal.

In the bit shown in FIGURE 1 of the drawing, the face and gage edge of each blade is provided with a hard surface 16 of tungsten carbide or similar material in order to increase blade resistance to wear and abrasion. The hard surfacing material may be applied by conventional welding techniques, utilizing Tube Borium or a similar hard metal carbide welding rod. In lieu of this, inserts of tungsten carbide or the like may be bonded to the face of each blade or embedded in recesses in the blade surface. Still another hard surfacing technique involves the bonding of a copper, nickel or similar matrix containing chips of hard metal carbide to the blade surface. This latter technique is generally preferred because it results in a blade which is essentially self-sharpening and has considerably greater shock resistance than blades provided with a continuous surface of hard metal carbide or similar material. Diamonds or inserts of tungsten carbide or a similar material 17 may be provided on the gage surface of the blade in order to minimize gage wear.

A nozzle assembly is mounted in the lower surface of the bit body in front of each of the blades in order to permit the discharge of drilling fluid from chamber 12 against the formation at high velocity. This assembly includes a steel or similar ferroalloy sleeve 18 which may protrude a short distance beyond the lower surface of the body, a tungsten carbide or similar hard metal carbide nozzle 19 positioned within sleeve 18, and a matrix 20 by means of which the tubular nozzle is bonded to the sleeve. Sleeve 18 contains an internal shoulder 21, below which it fits closely about the nozzle. Above the shoulder, the internal diameter of the sleeve is somewhat greater than the outer diameter of the nozzle. Metal matrix 20 is bonded to the sleeve and nozzle above shoulder 21 and extends upwardly beyond them to a shoulder 22 in the bit body. The matrix is not bonded to the body of the bit. Finely divided tungsten carbide or similar hard metal carbide dispersed throughout the matrix lends erosion resistance to the matrix. The inner surface of the nozzle and matrix are flared to provide a smooth entrance from chamber 12 into the nozzle. The entire assembly consisting of the sleeve, nozzle and matrix is held in place by weld 23 which extends over the sleeve adjacent the outer surface of the bit body. Hard surfacing 24 of Tube Borium or similar tungsten carbide welding material is applied over the weld and the steel sleeve in order to protect them against erosion.

The improved nozzle assembly thus utilized is fabricated by first forming nozzle 19 from cast or cemented tungsten carbide or a similar hard metal carbide having a Rockwell A hardness in excess of about 85. If a cast nozzle is employed, it may be formed by casting the molten carbide in a refractory mold of the desired shape. If a sintered nozzle is used, it may be produced by sintering a mixture of powdered tungsten carbide or similar hard metal carbide and iron, nickel or cobalt in a suitable mold at elevated temperature and pressure. Conventional casting and metal carbide sintering procedures familiar to those skilled in the art may be employed. The nozzle thus prepared may be ground to remove surface irregularities if desired.

A welding sleeve of steel is prepared by machining a block of steel or by sintering powdered steel in the conventional manner. This sleeve is placed in a carbon, ceramic or other refractory mold containing a recess conforming to the desired shape of the finished nozzle assembly. The metal carbide nozzle previously prepared is then fitted into the sleeve in the mold so that the matrix metal may be melted and poured into the void between the upper part of the sleeve and the upper part of the nozzle. Powdered tungsten carbide or similar hard metal carbide which has been screened to a size ranging between about 100 mesh and about 400 mesh on the Tyler scale and has been washed in carbon tetrachloride or a similar solvent is packed into the mold between and above the sleeve and nozzle. The mold may be vibrated to settle the powdered carbide and form a dense mass. The matrix metal to be used for bonding the sleeve and nozzle together, a cupronickel alloy containing 60 percent copper and 40 percent nickel which melts at a temperature of about 2336° F. for example, is mixed with a small amount of borax or other flux and placed in a separate crucible or in a cavity in the mold cover from which it can flow into the space containing the steel sleeve and powdered carbide as it melts. The use of a separate crucible or similar vessel is preferred, since this normally permits better control of the infiltration time and temperature conditions. The matrix metal is usually employed in the form of small pellets but may be used as a powder if desired. The mold and crucible, if a separate crucible is used, are then placed in a suitable oven or furnace and heated to an infiltration temperature in the range between about 1750° F. and about 2500° F. The exact temperature employed will depend largely upon the melting point of the matrix metal utilized. After all parts of the apparatus have reached the desired infiltration temperature, the molten matrix metal is poured from the crucible into the mold. If a separate crucible is not employed, the metal will flow downwardly from the mold cover on reaching the required temperature. The molten metal infiltrates the powdered metal carbide and effects a bond between the sleeve and the carbide nozzle. The powdered carbide partially dissolves in the molten matrix. The mold is held at the infiltration temperature for a period of from about 3 minutes to about 20 minutes and is thereafter allowed to cool. As it cools, the dissolved metal carbide in the matrix precipitates in the form of fine grains which increase the strength, hardness and melting point of the matrix. After it has cooled, the nozzle assembly may be removed from the mold. The assembly may be heat treated to remove thermal stresses set up during the infiltration process and may be ground or machined to remove surface irregularities if desired.

As pointed out earlier, the nozzle assembly may be installed in a drill bit or similar tool by welding the sleeve to the body of the tool. The weld may then be covered with tungsten carbide or a similar hard surfacing material to protect it and the adjacent sleeve surface from erosion caused by the discharge of fluids through the nozzle at high velocities. Since the matrix containing tungsten carbide melts above the temperatures normally incurred in welding and hard surfacing the nozzle assembly with a tungsten carbide welding material, the welding operations do not adversely affect the bond between the matrix and the sleeve and nozzle. The result is a nozzle assembly which is more easily installed and has greater resistance to erosion than nozzle assemblies employed in the past.

The erosion resistance of the improved nozzle assembly of the invention can readily be seen by considering the results obtained in an erosion test. A cemented tungsten carbide nozzle formed by sintering powdered tungsten carbide and cobalt in a mold at elevated temperature and pressure was used in the assembly. This nozzle had an inside diameter of 0.375 inch and an outside diameter of 1.125 inches. It was about 1.5 inches long and an overall contour similar to that of the nozzle shown in the drawing. A welding sleeve having a throat diameter of about 0.375 inch and an overall length of 2 inches was machined from AISI 1020 steel. The contour of the sleeve was similar to that of the sleeve shown in FIGURE 1. This sleeve and nozzle were placed in a carbon mold and powdered tungsten carbide ranging between about 100 mesh and about 400 mesh on the Tyler scale was packed into the mold void between the sleeve and nozzle. Pellets of a cupronickel alloy containing about 55 percent copper, about 35 percent nickel and about 10 percent tin were placed in a receptacle provided with a conduit communicating with the mold. The mold and receptacle and their contents were then placed in an oven and heated to a temperature of about 2250° F. As the cupronickel matrix metal melted in the receptacle, it flowed down into the mold, infiltrating the powdered tungsten carbide and effecting a metallurgical bond between the steel sleeve and the tungsten carbide nozzle. The mold was held at the infiltration temperature of 2250° F. for about 20 minutes and was then allowed to cool. The assembly including the nozzle, sleeve and matrix was removed from the mold and irregularities on the upper surface of the matrix were removed by grinding.

The nozzle assembly thus fabricated was welded into one port of a two bladed, two fluid port, 4¾ inch drag bit using commercial welding rods and conventional electric arc welding equipment. No difficulties in installing the assembly by welding were experienced. No effort was made to restrict the welding temperature. There were no indications that the welding in any way affected the bond between the matrix and the sleeve and nozzle. The other port in the bit was plugged by welding in a steel plug.

To simulate the washing action and the currents set up about a bit in an actual borehole, the drill bit was placed at the bottom of a 4¾ inch hole drilled into a block of hard dolomite. The block and bit were chained in place in a steel tank. The bit was connected to the discharge line of a large diesel-driven pump with a length of 8 inch hydraulic hose. A second steel tank connected in series to the first by an 8 inch pipe 30 inches long and to the intake side of the pump by a 10 foot length of 8 inch hydraulic hose provided a closed circulation system. A pressure gage was located near the pump safety valve.

A drilling mud prepared from 874 gallons of water, 80 gallons of sand and 600 pounds of bentonite gel was placed in the tank on the intake side of the pump. The gel had been mixed with the water 5 days earlier in order to obtain full hydration. The sand was added on the day of the test and was held in suspension by the mud. This mud was then pumped through the single nozzle of the bit at a rate of 180 gallons per minute and at a pressure of 2000 pounds per square inch. The pump developed 208 horsepower. At the end of 8 minutes, the fluid had jetted through the 2 inches of dolomite at the bottom of the block.

To continue the tests under simulated drilling conditions after the dolomite block had been washed out, the bit was encased in a 5 inch steel pipe having an internal diameter of 4⅞ inches and a ½ inch steel plate was welded in place over the bottom of the pipe. Mud circulation was resumed at a rate of 152 gallons per minute and a hydraulic pressure of 1500 pounds per square inch. The ½ inch steel plate was washed out after 5 minutes. A second ½ inch steel plate was then welded to the bottom of the 5 inch pipe and a ¾ inch disc of rubber was placed in the bottom of the pipe to protect the plate. Mud was again circulated at a rate of 152 gallons per minute and a hydraulic pressure of 1500 pounds per square inch. The rubber disc and steel plate failed after 6 minutes of circulation. Attempts to simulate an actual borehole were then abandoned and the nozzle was discharged directly into the mud tank. Testing was continued until a total of about 4 hours nozzle discharge time had elapsed. During this period, two holes were jetted through the bottom of the steel tank. The test was then discontinued and the nozzle was examined for evidence of erosion. It was found that neither the nozzle nor the matrix had been eroded to any significant extent. A very slight amount of wear could be detected at the throat of the nozzle. The throat had worn to an oval configuration and measured 0.381 inch along its major diameter and 0.377 inch along its minor diameter. This was an average increase in diameter of only 1.7 percent. There were no indications of any tendency toward nozzle washout.

The test described above was an extremely severe one carried out at very high nozzle velocities, as is indicated by the rapidity with which the fluid eroded holes through dolomite, steel and a combination of rubber and steel. A conventional drag bit nozzle would be expected to washout during such a test after only a short time. The fact that the nozzle assembly of the invention showed only negligible wear and no tendency to washout during about 4 hours of such testing demonstrates that the improved assembly has extremely high resistance to erosion. This high erosion resistance, coupled with the ease with which the assembly can be installed, clearly marks the assembly as superior to those utilized in the past.

Although the improved nozzle assembly disclosed herein is particularly adapted for use with rotary drill bits and has been discussed primarily in terms of nozzles to be employed with drag bits, it is not limited to drag bit applications. It can be used equally well on roller cone bits, percussion type bits, sand blasting apparatus and other equipment which requires a nozzle that can be easily installed and yet has extremely high resistance to erosion. A variety of different arrangements of the nozzle, sleeve and matrix can be utilized, depending in part upon the nozzle discharge pattern desired, and hence the invention is not limited to the particular configuration described above and depicted in the drawing. In some applications not requiring that the assembly be welded in place in the field, the welding sleeve may be omitted and the matrix may be bonded directly to the wall of a ferroalloy tool. These and other modifications of the invention will be readily apparent to those skilled in the art.

This application is a continuation-in-part of Serial Number 73,042, "Erosion Resistant Nozzle Assembly," filed in the names of David S. Rowely and Harold C. Bridwell on December 1, 1960, now abandoned.

What is claimed is:

1. An improved nozzle assembly comprising a ferroalloy supporting structure containing an opening extending through said structure, a tubular nozzle of hard metal carbide having a Rockwell A hardness in excess of about 85 positioned within said opening, and a metallic matrix containing finely divided hard metal carbide bonded to said nozzle and said surrounding ferroalloy structure, said matrix melting between about 1550° F. and about 2400° F. and in the molten state having the ability to wet said metallic carbide and said ferroalloy structure.

2. An assembly as defined by claim 1 wherein said metal carbide is tungsten carbide.

3. An assembly as defined by claim 1 wherein said metallic matrix includes a cupronickel alloy containing from about 25 percent to about 75 percent nickel.

4. An improved nozzle assembly comprising a ferroalloy sleeve, a tubular nozzle of hard metal carbide having a Rockwell A hardness in excess of about 85 disposed within said sleeve, and a matrix metal containing finely divided hard metal carbide bonded to said sleeve and nozzle, said matrix metal melting between about 1550° F. and about 2400° F. and in the molten state having the ability to wet said metal carbide and said ferralloy sleeve.

5. An assembly as defined by claim 4 wherein said metal carbide is a tungsten carbide alloy.

6. An assembly as defined by claim 4 wherein said metal carbide is a cemented carbide containing a cobalt binder.

7. An assembly as defined by claim 4 wherein said matrix metal is a nickel alloy.

8. An improved drill bit comprising a hollow bit body containing at least one discharge port in the lower surface thereof, a steel sleeve welded in said discharge port, a matrix metal containing finely divided hard metal carbide bonded to the inner surface of said sleeve, a tubular nozzle of hard metal carbide having a Rockwell A hardness in excess of about 85 bonded within said sleeve by said matrix metal, and at least one cutting element depending from said bit body adjacent said discharge port, said matrix metal melting between about 1550° F. and about 2400° F. and in the molten state having the ability to wet said steel sleeve and said metal carbide nozzle.

9. A bit as defined by claim 8 wherein the weld between said sleeve and said bit body is covered by a hard metal carbide.

10. A bit as defined by claim 8 wherein said hard metal carbide comprises tungsten carbide.

11. A method for bonding a tubular nozzle of hard metal carbide within an opening in a ferroalloy supporting structure which comprises positioning said nozzle and said supporting structure in a refractory mold, placing finely divided hard metal carbide in said opening in contact with said nozzle and supporting structure, heating said mold and its contents to a temperature between about 1750° F. and about 2500° F., infiltrating said finely divided metal carbide with a molten matrix metal melting between about 1550° F. and about 2400° F. and having the ability to wet said carbide nozzle and said supporting structure, permitting said mold to cool, and removing said supporting structure with said nozzle bonded in said opening therein.

References Cited in the file of this patent

UNITED STATES PATENTS

| | | |
|---|---|---|
| 2,060,959 | Terry | Nov. 17, 1936 |
| 2,064,255 | Garfield | Dec. 15, 1936 |
| 2,712,988 | Kurtz | July 12, 1955 |
| 2,831,661 | Brown | Apr. 22, 1958 |
| 2,950,090 | Swart | Aug. 23, 1960 |